(12) United States Patent
Franklin

(10) Patent No.: US 12,185,828 B2
(45) Date of Patent: Jan. 7, 2025

(54) WAVE HAIRSTYLE GENERATING BRUSH

(71) Applicant: Antawon Franklin, West Hempstead, NY (US)

(72) Inventor: Antawon Franklin, West Hempstead, NY (US)

( * ) Notice: Subject to any disclaimer, the term of this patent is extended or adjusted under 35 U.S.C. 154(b) by 0 days.

(21) Appl. No.: 18/242,150

(22) Filed: Sep. 5, 2023

(65) Prior Publication Data

US 2024/0180321 A1 Jun. 6, 2024

Related U.S. Application Data

(63) Continuation of application No. 16/543,976, filed on Aug. 19, 2019, now Pat. No. 11,779,104.

(60) Provisional application No. 62/719,721, filed on Aug. 20, 2018.

(51) Int. Cl.
| | | |
|---|---|---|
| *A46B 13/02* | (2006.01) | |
| *A45D 2/00* | (2006.01) | |
| *A46B 17/08* | (2006.01) | |
| *H01M 10/0525* | (2010.01) | |
| *H01M 50/247* | (2021.01) | |

(52) U.S. Cl.
CPC ............. *A46B 13/023* (2013.01); *A45D 2/00* (2013.01); *A46B 17/08* (2013.01); *H01M 10/0525* (2013.01); *H01M 50/247* (2021.01); *A46B 2200/104* (2013.01); *H01M 2220/30* (2013.01)

(58) Field of Classification Search
CPC .......... A46B 9/023; A46B 13/02; A45D 2/00; A45D 24/00; A61H 23/0263
See application file for complete search history.

(56) References Cited

U.S. PATENT DOCUMENTS

| | | |
|---|---|---|
| 5,485,646 A | 1/1996 | Merritt |
| 2014/0107543 A1 | 4/2014 | Pazouki |
| 2016/0135582 A1 | 5/2016 | Yen |
| 2019/0098978 A1 | 4/2019 | Thiebaut et al. |

FOREIGN PATENT DOCUMENTS

| | | |
|---|---|---|
| CA | 2721834 A1 | 11/2009 |
| CN | 109429484 A | 3/2019 |
| WO | 2020061514 A1 | 3/2020 |

*Primary Examiner* — Shay Karls
(74) *Attorney, Agent, or Firm* — Shore IP Group, PLLC; Sean R. Wilsusen

(57) ABSTRACT

A motorized hairbrush includes a bristle securing base including a first recessed cavity formed in the bristle securing base. A handle is coupled to the bristle securing base. The handle includes a second recessed cavity facing the first recessed cavity. A vibrating motor is disposed in the first recessed cavity. A battery is electrically connected to the vibrating motor. An activation switch is coupled to the battery and is configured to activate the vibrating motor.

20 Claims, 13 Drawing Sheets

WAVE HAIRSTYLE GENERATING BRUSH

CROSS-REFERENCE TO RELATED APPLICATION

This U.S. Non-Provisional Patent application claims priority to U.S. Provisional Patent Application No. 62/719,721, filed on Aug. 20, 2018, the disclosure of which is incorporated by reference herein in its entirety.

FIELD OF THE INVENTION

The present invention relates to a hair brush for generating a wave hairstyle. More particularly, an exemplary embodiment of the present invention relates to a motorized brush for generating a wave hairstyle.

BACKGROUND

A wave or "waves" hairstyle is a type of hairstyle in which curls are brushed and flattened out, creating a ripple-like pattern. The hairstyle may be formed in a relatively short-cropped haircut and frequent brushing of the curls, which trains the curls to flatten out. Thus, a plurality of peaks and valleys may appear between the trained curls. Pomades and moisturizers can help hold the hair in place while preventing the hair from getting too dry during a process of forming the wave hairstyle. A do-rag may be worn to preserve moisture while compressing the hair and holding it in place, particularly when sleeping, during the process of forming the wave hairstyle. Thus, the formation of the wave hairstyle may be a relatively long process involving frequent brushing over an extended period of time. For example, brushing may take place over a period of several months to achieve a desired hairstyle.

Further, continued styling of hair may be carried out after the initial hairstyle is formed, as new hair continues to grow.

Both the initial styling and continued styling may be performed by a relatively stiff bristled brush. Thus, the process of forming and maintaining a wave hairstyle may be a time consuming process involving repeated brushing.

SUMMARY

According to an exemplary embodiment of the present invention, a motorized hairbrush includes a bristle securing base including a first recessed cavity formed in the bristle securing base. A handle is coupled to the bristle securing base. The handle includes a second recessed cavity facing the first recessed cavity. A vibrating motor is disposed in the first recessed cavity. A battery is electrically connected to the vibrating motor. An activation switch is coupled to the battery and is configured to activate the vibrating motor.

According to an exemplary embodiment of the present invention, the handle may include wood. The handle including wood may have a substantially oval shape.

According to an exemplary embodiment of the present invention, a plurality of vibrating motors may be disposed in the first recessed cavity.

According to an exemplary embodiment of the present invention, each of the plurality of vibrating motors may be configured to be individually activated or deactivated.

According to an exemplary embodiment of the present invention, the plurality of vibrating motors may be controlled by a programmable motherboard. The programmable motherboard includes a processor and a memory.

According to an exemplary embodiment of the present invention, the battery may be a rechargeable battery.

According to an exemplary embodiment of the present invention, the rechargeable battery may be chargeable via a USB port.

According to an exemplary embodiment of the present invention, the USB port may be disposed in the first recessed cavity.

According to an exemplary embodiment of the present invention, the motorized hairbrush may include a brush count meter. The brush count meter may be configured to count a number of brush strokes. The brush count meter may include a gyroscope and/or an accelerometer. The motorized hairbrush may include a humidity sensor and/or a temperature sensor.

According to an exemplary embodiment of the present invention, the vibrating motor may be a coin cell motor.

According to an exemplary embodiment of the present invention, the vibrating motor may be a cylindrical motor.

According to an exemplary embodiment of the present invention, the vibrating motor may be configured to operate at a plurality of speeds.

According to an exemplary embodiment of the present invention, the vibrating motor may include, low, medium and high speed settings.

According to an exemplary embodiment of the present invention, the battery may be a lithium ion battery.

According to an exemplary embodiment of the present invention, the bristle securing base may be coupled to the handle by a hinge.

According to an exemplary embodiment of the present invention, the hinge may be configured to open and close the bristle securing base to expose the first recessed cavity and the second recessed cavity.

According to an exemplary embodiment of the present invention, the battery may be disposed in the first recessed cavity. A plurality of vibrating motors may be electrically connected with a motherboard disposed in the second recessed cavity.

BRIEF DESCRIPTION OF THE FIGURES

The above and other features of the present invention will become more apparent by describing in detail exemplary embodiments thereof, with reference to the accompanying drawings, in which.

DETAILED DESCRIPTION

Figure 1:
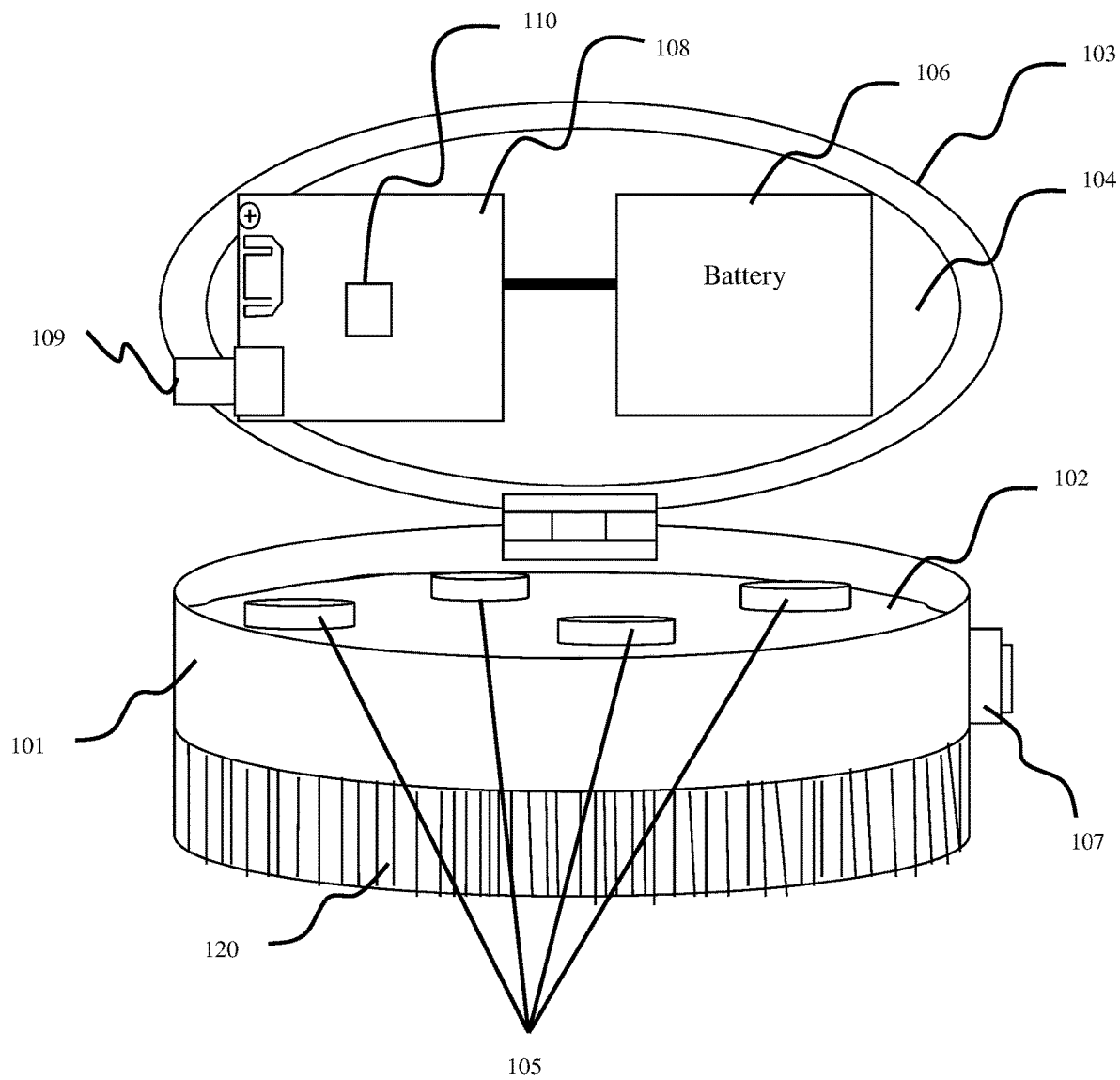
FIG. 1 is a side view of a motorized hairbrush according to an exemplary embodiment of the present invention in an open state.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

"About" or "approximately" as used herein may be inclusive of the stated value and means within an acceptable range of variation for the particular value as determined by one of ordinary skill in the art, considering the measurement in question and the error associated with measurement of the particular quantity (e.g., the limitations of the measurement system). For example, "about" may mean within one or more standard variations, or within +30%, 20%, 10%, 5% of the stated value.

Descriptions of technical features or aspects of an exemplary embodiment of the present disclosure should typically be considered as available and applicable to other similar features or aspects in another exemplary embodiment of the present disclosure. Accordingly, technical features described herein according to one exemplary embodiment of the present disclosure may be applicable to other exemplary embodiments of the present disclosure, and thus duplicative descriptions may be omitted herein.

Exemplary embodiments of the present disclosure will be described more fully below (e.g., with reference to the accompanying drawings). Like reference numerals may refer to like elements throughout the specification and drawings.

The motorized hairbrush described herein may be employed for forming, developing, or maintaining a wave or "waves" hairstyle, which is a type of hairstyle in which curls are brushed and flattened out, creating a ripple-like pattern. The hairstyle may be formed in a relatively short-cropped haircut and frequent brushing of the curls, which trains the curls to flatten out. Thus, a plurality of peaks and valleys may appear between the trained curls. The formation of the wave hairstyle may conventionally be a relatively long process involving frequent brushing over an extended period of time. For example, brushing may take place over a period of several months to achieve a desired hairstyle. However, the motorized hairbrush described herein decreases an amount of time for forming a wave hairstyle by more rapidly training a user's hair into a desired style of configuration. The motorized hairbrush described herein also reduces an amount of time and a number of brush strokes needed to effectively maintain a wave hairstyle. The vibration formed by the vibrating motors increases a rate at which a user's hair is trained or styled, while reducing an amount of effort required by a user to create or maintain a desired hairstyle.

Figure 2:
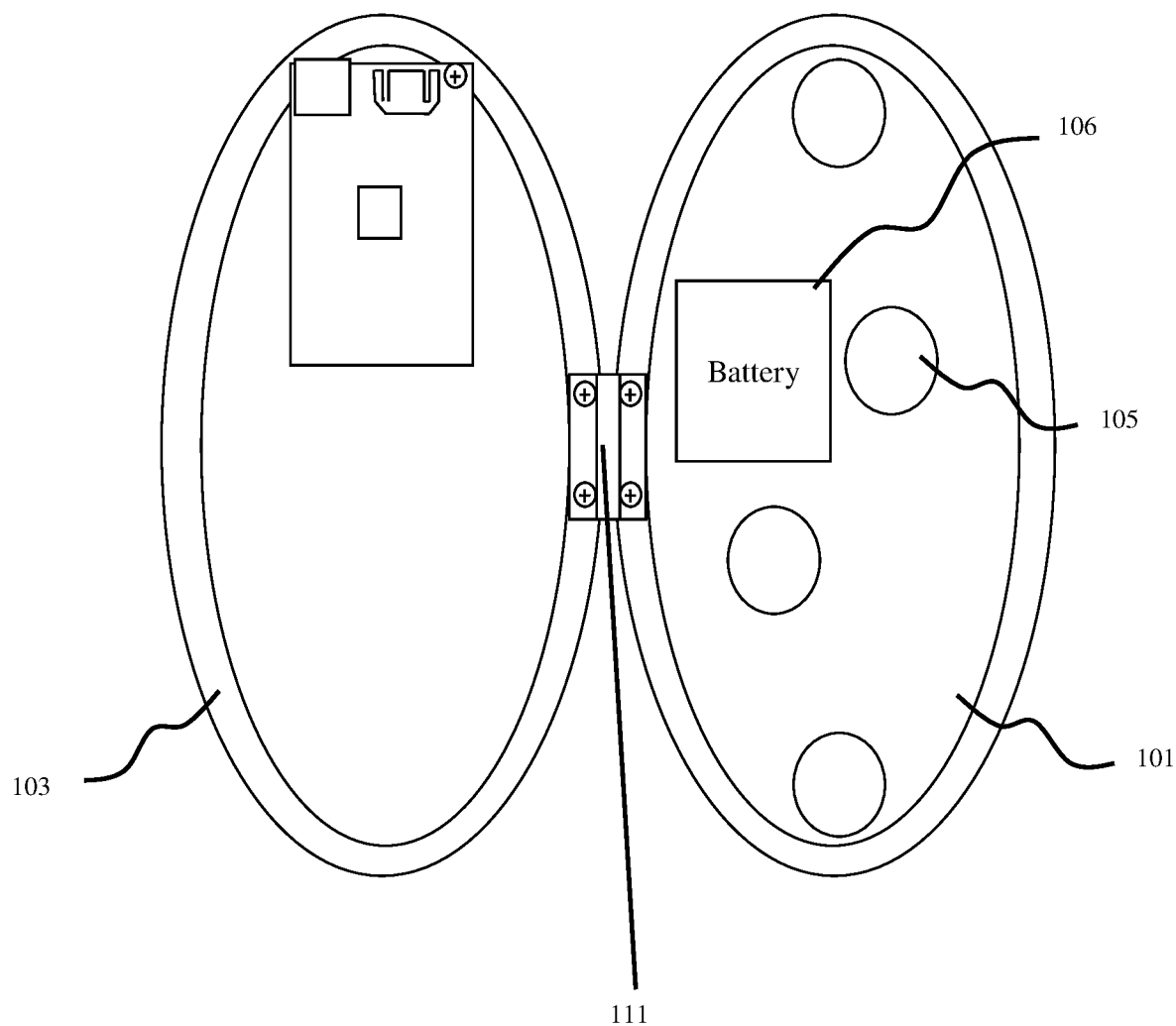
FIG. 2 is a plan view of a motorized hairbrush according to an exemplary embodiment of the present invention in an open state.
Figure 3:
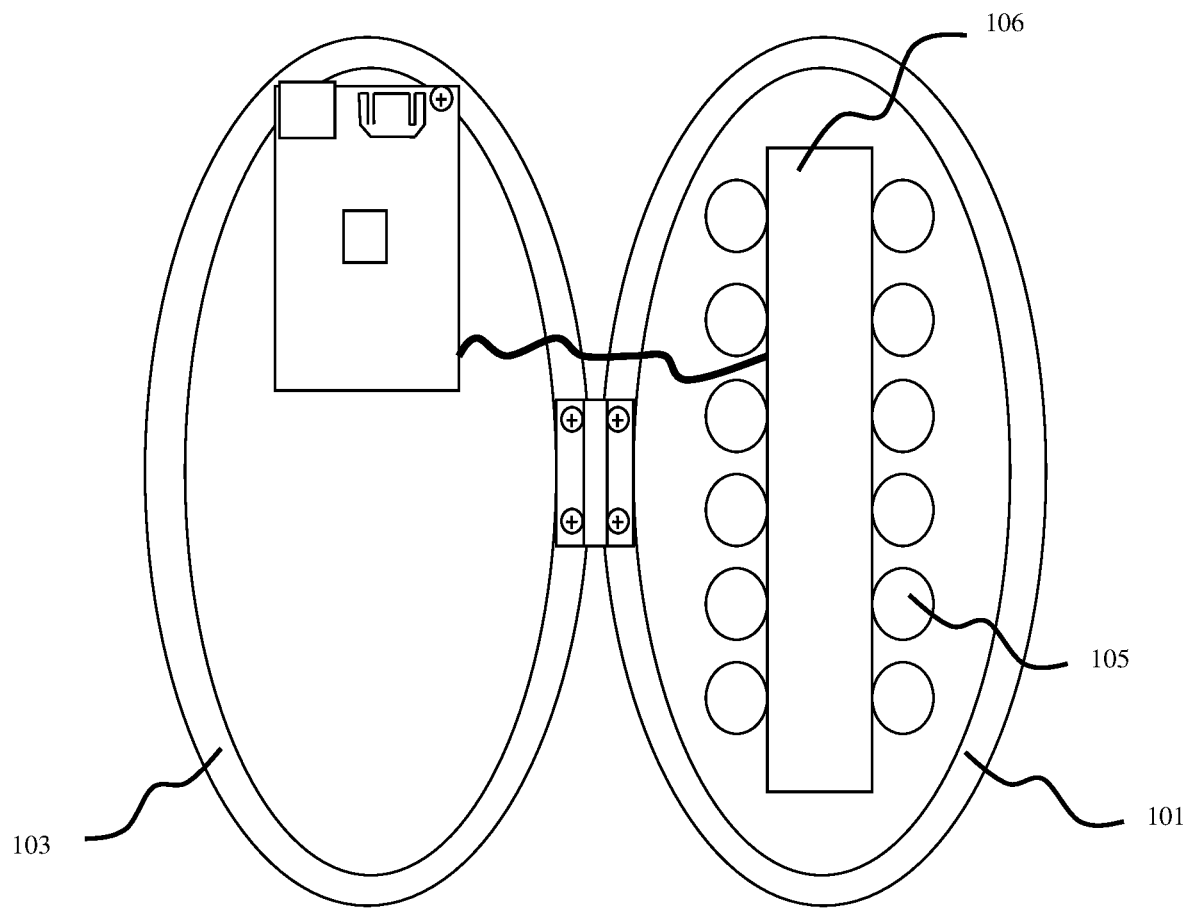
FIG. 3 is a plan view of a motorized hairbrush according to an exemplary embodiment of the present invention in an open state.
Figure 7:
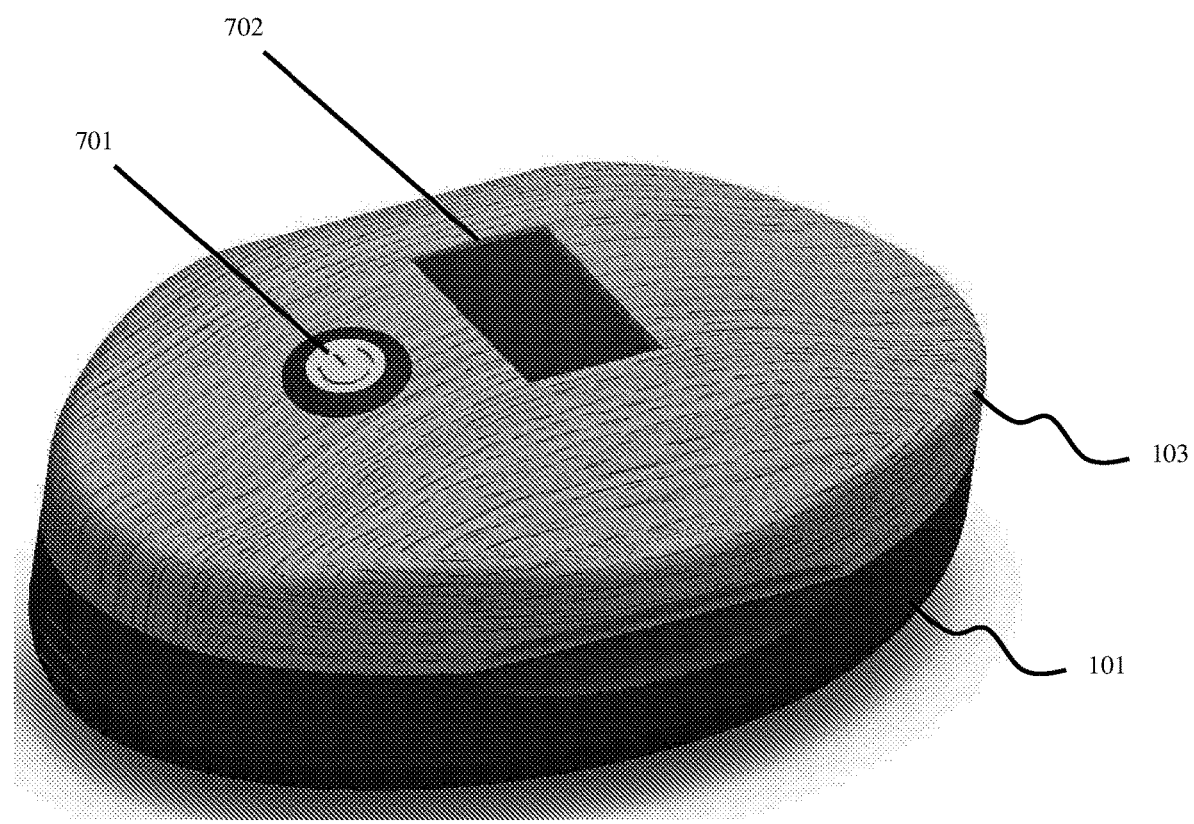
FIG. 7 illustrates a perspective view of a motorized hairbrush according to an exemplary embodiment of the present invention in a closed state.
Figure 8:
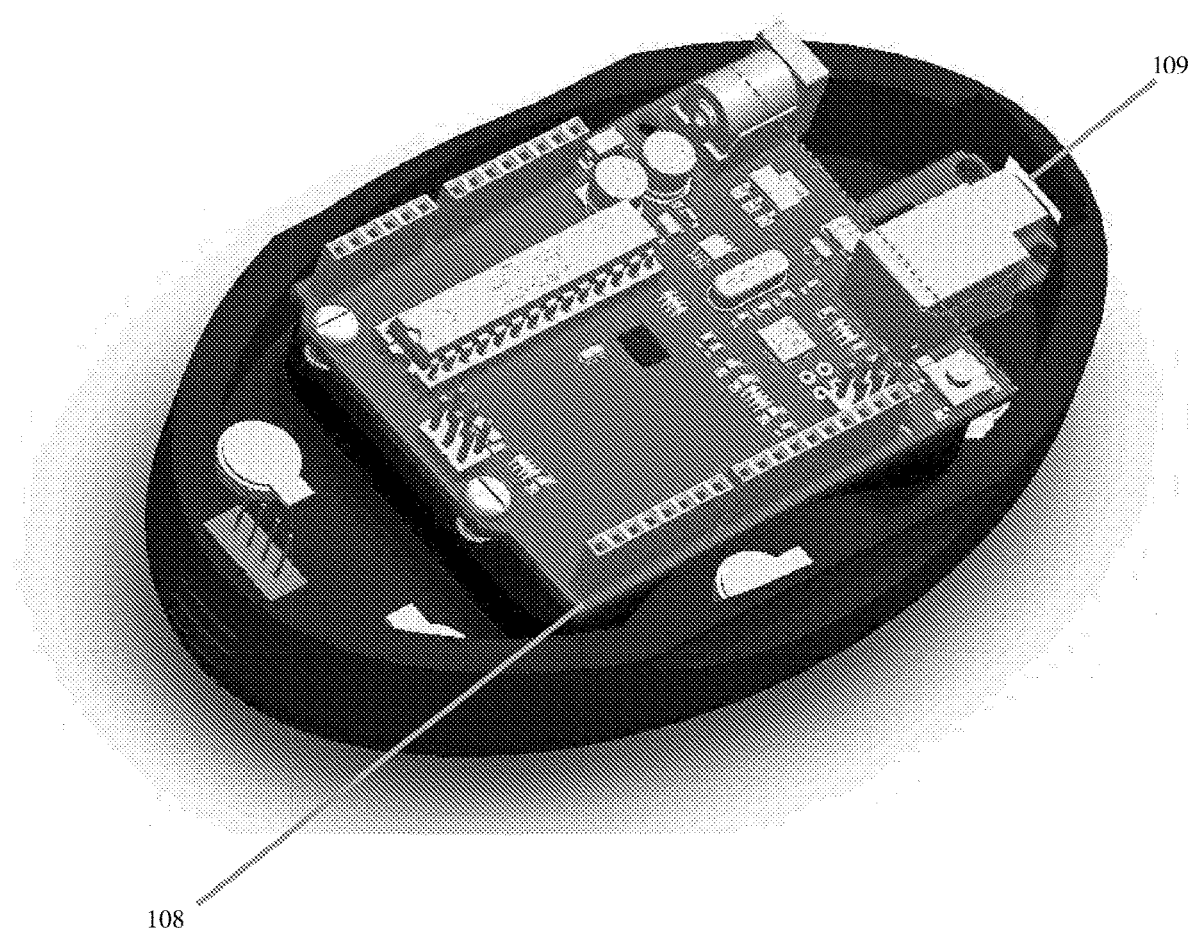
FIG. 8 illustrates a main circuit board of a motorized hairbrush according to an exemplary embodiment of the present invention.
Figure 9:
FIG. 9 illustrates a gyroscope and accelerometer of a motorized hairbrush according to an exemplary embodiment of the present invention.
Figure 10:
FIG. 10 illustrates a battery cover of a motorized hairbrush according to an exemplary embodiment of the present invention.
Figure 11:
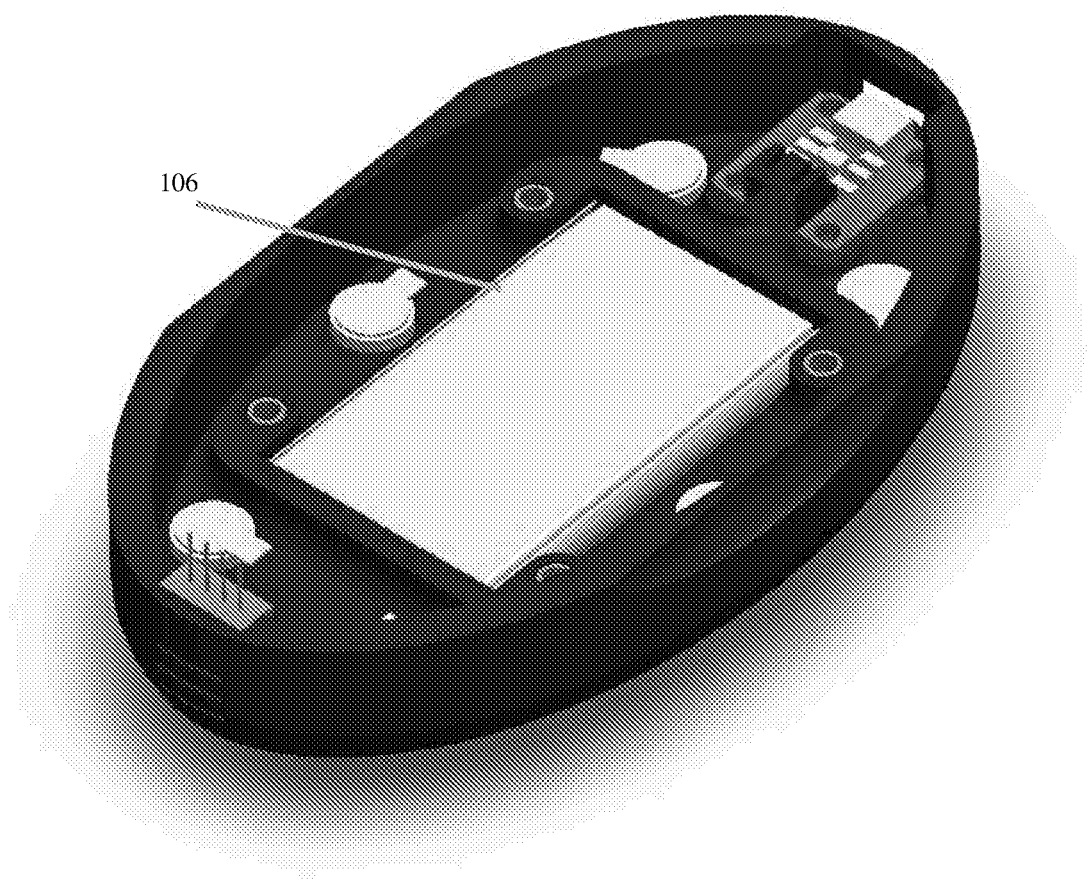
FIG. 11 illustrates a battery and power converter of a motorized hairbrush according to an exemplary embodiment of the present invention.
Figure 12:
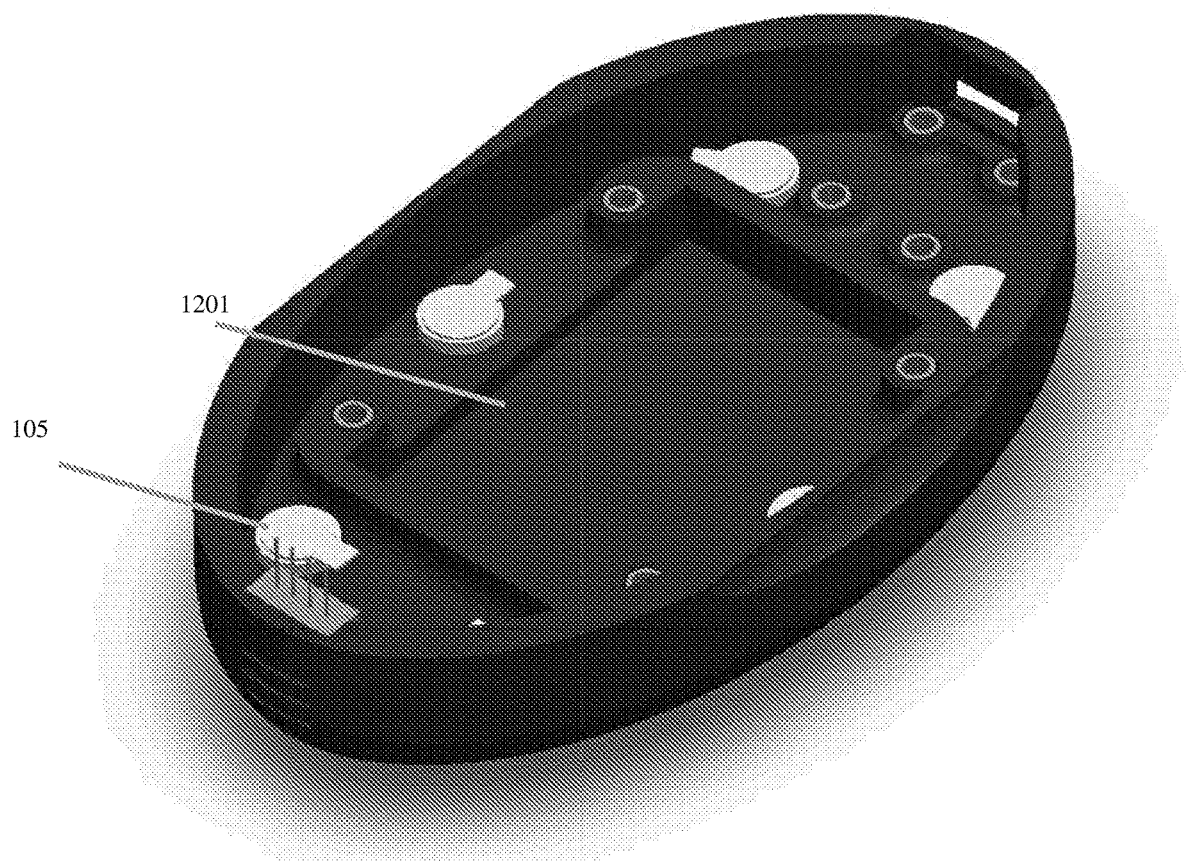
FIG. 12 illustrates a battery compartment and an exemplary arrangement of motors of a motorized hairbrush according to an exemplary embodiment of the present invention.
Figure 13:
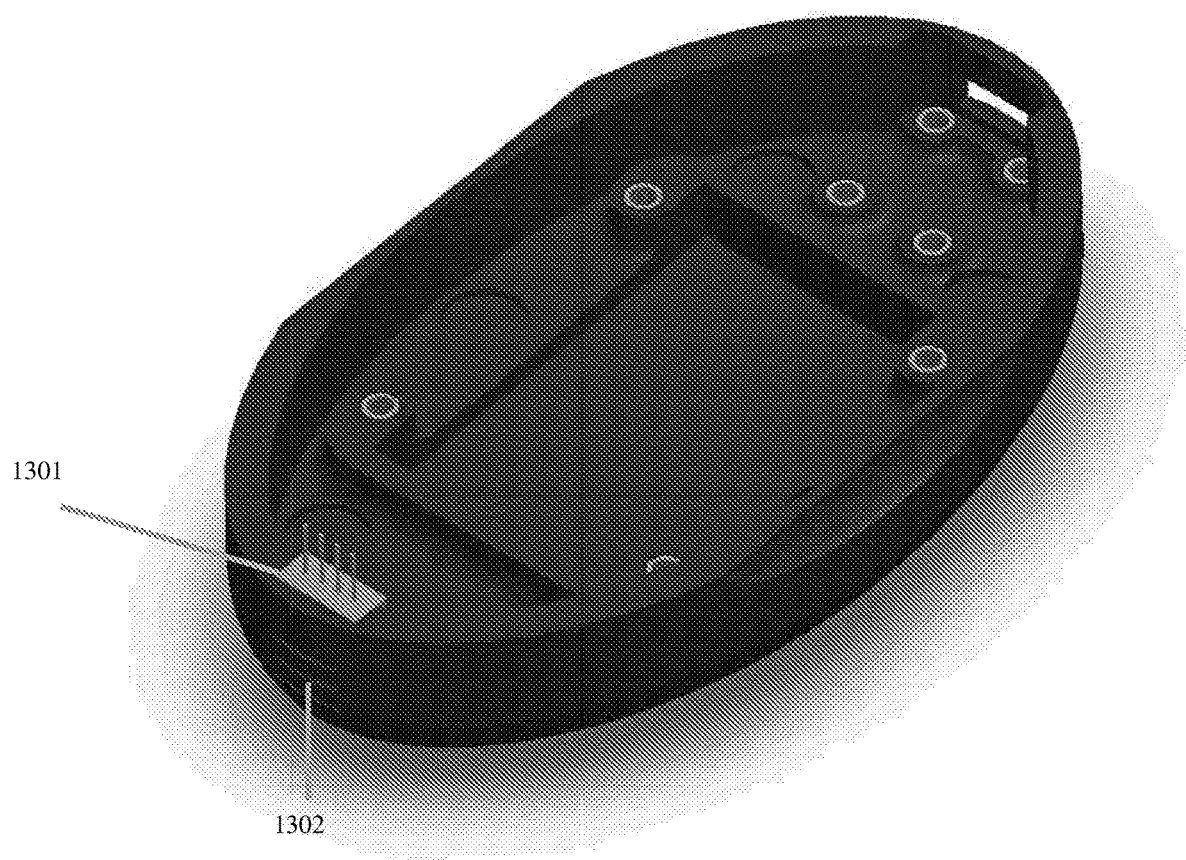
FIG. 13 illustrates a humidity sensor of a motorized hairbrush according to an exemplary embodiment of the present invention.
Figure 14:
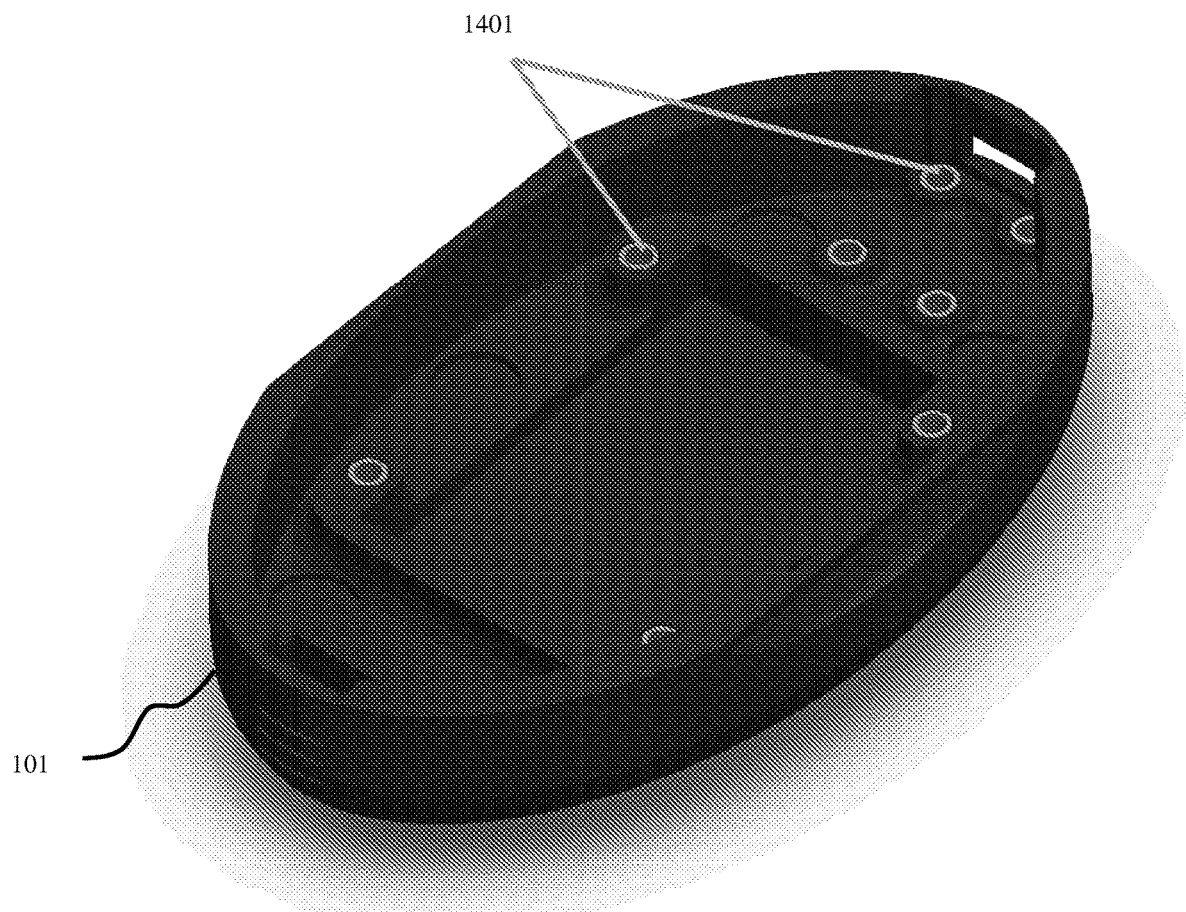
FIG. 14 illustrates a bottom compartment and a plurality of attachment points for coupling with a top compartment of a motorized hairbrush according to an exemplary embodiment of the present invention.

FIG. 1 is a side view of a motorized hairbrush according to an exemplary embodiment of the present invention in an open state. FIG. 2 is a plan view of a motorized hairbrush according to an exemplary embodiment of the present invention in an open state. FIG. 3 is a plan view of a motorized hairbrush according to an exemplary embodiment of the present invention in an open state. FIG. 7 illustrates a perspective view of a motorized hairbrush according to an exemplary embodiment of the present invention in a closed state. FIG. 8 illustrates a main circuit board of a motorized hairbrush according to an exemplary embodiment of the present invention. FIG. 9 illustrates a gyroscope and accelerometer of a motorized hairbrush according to an exemplary embodiment of the present invention. FIG. 10 illustrates a battery cover of a motorized hairbrush according to an exemplary embodiment of the present invention. FIG. 11 illustrates a battery and power converter of a motorized hairbrush according to an exemplary embodiment of the present invention. FIG. 12 illustrates a battery compartment and an exemplary arrangement of motors of a motorized hairbrush according to an exemplary embodiment of the present invention. FIG. 13 illustrates a humidity sensor of a motorized hairbrush according to an exemplary embodiment of the present invention. FIG. 14 illustrates a bottom compartment and a plurality of attachment points for coupling with a top compartment of a motorized hairbrush according to an exemplary embodiment of the present invention.

Referring to FIGS. 1 to 3 and 7-14, according to an exemplary embodiment of the present invention, a motorized hairbrush may include a bristle securing base 101 including a first recessed cavity 102 formed in the bristle securing base 101. A plurality of bristles 120 may be coupled to the bristle securing base 101. A handle 103 may be coupled to the bristle securing base 101. The handle 103 may include a second recessed cavity 104 facing the first recessed cavity 102. A vibrating motor 105 may be disposed in the first recessed cavity 102. A battery 106 may be electrically connected to the vibrating motor 105. An activation switch 107 may be coupled (e.g., electrically connected) to the battery 106 and may be configured to activate the vibrating motor 105. Alternatively, the activation switch 107 may be electrically connected to a motherboard 108 described in more detail below.

According to an exemplary embodiment of the present invention, the handle 103 may include wood. According to an exemplary embodiment of the present invention, the handle 103 including wood may have a substantially oval shape. However, exemplary embodiments of the present invention are not limited thereto, and the handle 103 may have other shapes such as a circular, square or rectangular shape, and may include or be formed of other materials (e.g., plastic), as desired.

Bristles 120 coupled to the bristle securing base 101 may be relatively stiff bristles. The bristles 120 may include a plurality of synthetic fibers, such as nylon. Alternatively, the bristles 120 may include a natural bristle, such as a bristle formed of animal hair.

As an example, an arrangement of the bristles 120 may be modified, as desired. For example rows of alternating stiff and soft bristles may be secured to the bristle securing base 101.

According to an exemplary embodiment of the present invention, a plurality of vibrating motors 105 may be disposed in the first recessed cavity 102. Each of the plurality of vibrating motors 105 may be configured to be individually activated or deactivated. For example, the plurality of vibrating motors 105 may be controlled by a programmable motherboard 108. The programmable motherboard 108 may include a processor and a memory. The programmable motherboard 108 may individually control each of the motors 105. Exemplary wiring layouts of the plurality of vibrating motors 105 are described in more detail below with reference to FIGS. 4-6.

According to an exemplary embodiment of the present invention, the battery 106 may be a rechargeable battery. For example, the rechargeable battery may be chargeable via a USB port 109. The USB port 109 may be accessible through a hole formed in the handle 103 and/or the bristle securing base 101. For example, the hole may be formed in a side of the handle 103 and/or the bristle securing base 101. According to an exemplary embodiment of the present invention, the USB port 109 may be disposed in the first recessed cavity 102. The USB port 109 may be disposed in or may be electrically in communication with the motherboard 108 described herein.

According to an exemplary embodiment of the present invention, the battery 106 may be a lithium ion battery. However, exemplary embodiments of the present invention are not limited thereto, and other batteries may be employed, as desired.

According to an exemplary embodiment of the present invention, the motorized hairbrush may include a brush count meter 110. The brush count meter 110 may be configured to count a number of brush strokes. The brush count meter 110 may include and accelerator and gyroscope 901 (see, e.g., FIG. 9). The number of brush strokes may be displayed on a digital screen 702 (see, e.g., FIG. 7) disposed on an outer surface of the motorized hairbrush. For example, the digital screen 702 may be disposed on the handle 103, such as on a side or top surface of the handle 103. The digital screen 702 may additionally display an air temperature and/or a humidity level, as described herein.

According to an exemplary embodiment of the present invention, the vibrating motor 105 may be a coin cell motor. Alternatively, the vibrating motor 105 may be a cylindrical motor. However, exemplary embodiments of the present invention are not limited thereto, and other types of vibrating motors may be employed.

According to an exemplary embodiment of the present invention, the vibrating motor 105 may be configured to operate at a plurality of speeds. For example, the vibrating motor 105 may include, low, medium and high speed settings. Motor settings may be controlled by the programmable motherboard 108 described herein.

According to an exemplary embodiment of the present invention, the bristle securing base may be coupled to the handle by a hinge 111. The hinge 111 may be configured to open and close the bristle securing base 101 to expose the first recessed cavity 102 and the second recessed cavity 104.

According to an exemplary embodiment of the present invention, the battery 106 may be disposed in the first recessed cavity 102. A plurality of vibrating motors 105 may be electrically connected with the motherboard 108, which may disposed in the second recessed cavity 104 (as opposed to the first recessed cavity 102). The motherboard 108 may be used to control charging of the motorized hairbrush, and may control activation or deactivation of the individual vibrating motors 105 described herein. However, positions of individual components described herein are not limited and may be modified, as desired.

Figure 4:
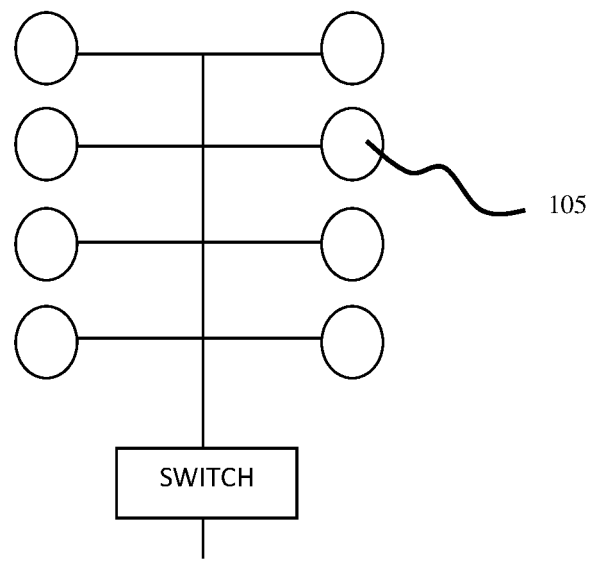
FIG. 4 is a schematic view of a wiring layout of a plurality of vibrating motors of a motorized hairbrush according to an exemplary embodiment of the present invention.
Figure 5:
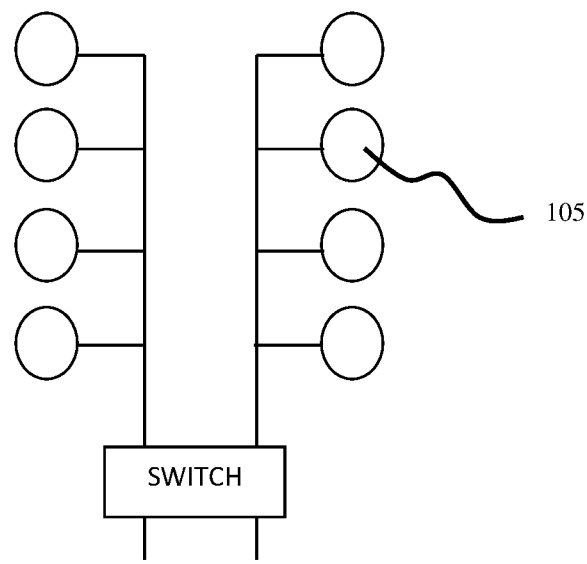
FIG. 5 is a schematic view of a wiring layout of a plurality of vibrating motors of a motorized hairbrush according to an exemplary embodiment of the present invention.
Figure 6:
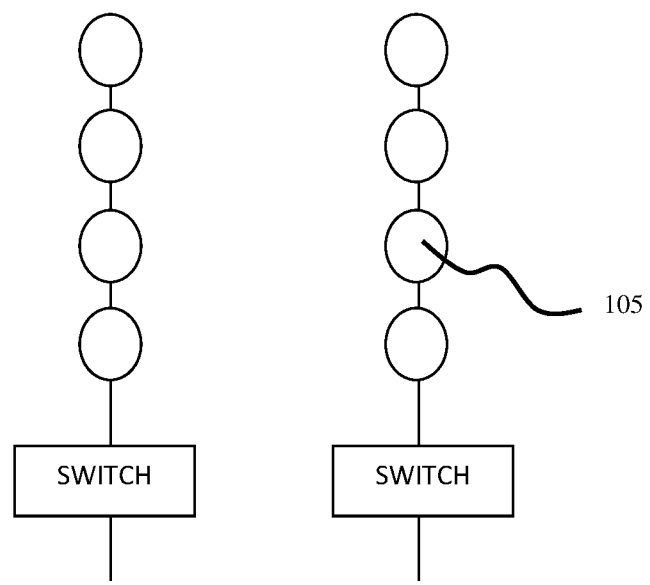
FIG. 6 is a schematic view of a wiring layout of a plurality of vibrating motors of a motorized hairbrush according to an exemplary embodiment of the present invention.

FIG. 4 is a schematic view of a wiring layout of a plurality of vibrating motors of a motorized hairbrush according to an exemplary embodiment of the present invention. FIG. 5 is a schematic view of a wiring layout of a plurality of vibrating motors of a motorized hairbrush according to an exemplary embodiment of the present invention. FIG. 6 is a schematic view of a wiring layout of a plurality of vibrating motors of a motorized hairbrush according to an exemplary embodiment of the present invention.

Referring to FIGS. 4-6, a number of different wiring layouts may be employed. For example, each vibrating motor 105 may be coupled to an on/off switch (e.g., 701) or to the motherboard 108 described herein, either in series or in parallel. Thus, each vibrating motor 105 may be activated simultaneously. Alternatively, each vibrating motor 105 may be individually controlled.

According to an exemplary embodiment, the vibrating motors 105 may be arranged randomly. The vibrating motors 105 may be arranged in a zigzag pattern, or may be aligned in a number of rows or columns.

Referring again to FIGS. 10-12, the battery 106 may be positioned in a battery compartment 1201 covered by a battery cover 1001 positioned in the first recessed cavity 102.

Referring again to FIG. 13 again, a moisture sensor 1301 may detect moisture of a user's scalp and/or hair through an airflow slot 1302. The moisture sensor 1301 may additionally include a temperature sensor. The moisture and temperature may be displayed on screen 702. The moisture sensor 1301 may be controlled by the motherboard 108 described herein.

Referring again to FIG. 14, the handle 103 may be connected with the bristle securing base 101 by a plurality of attachment points 1401. For example, detachable pins may connect each attachment point 1401 with a corresponding attaching point on the handle 103.

Having described exemplary embodiments of the present invention, it is further noted that it is readily apparent to those of ordinary skill in the art that various modifications may be made without departing from the spirit and scope of the present invention.

What is claimed is:

1. A motorized hairbrush, comprising:
   a bristle securing base;
   a plurality of bristles extending from the bristle securing base, wherein the bristles of the plurality of bristles define a stiff texture configured to flatten curled hair;
   a handle coupled to the bristle securing base;
   a plurality of vibrating motors;
   a battery electrically connected to the vibrating motors of the plurality of vibrating motors; and
   an activation switch coupled to the battery and configured to activate the vibrating motors of the plurality of vibrating motors,
   wherein each of the plurality of vibrating motors is configured to be individually activated or deactivated, and
   wherein the vibrating motors of the plurality of vibrating motors are controlled by a programmable motherboard, the programmable motherboard including a processor and a memory.

2. The motorized hairbrush of claim 1, wherein the handle comprises wood.

3. The motorized hairbrush of claim 2, wherein the handle comprising wood has a substantially oval shape.

4. The motorized hairbrush of claim 1, wherein each of the plurality of vibrating motors are disposed in a recessed cavity defined in the bristle securing base or the handle.

5. The motorized hairbrush of claim 1, wherein each of the plurality of vibrating motors are configured to be individually activated or deactivated to operate at different rates of vibration.

6. The motorized hairbrush of claim 1, wherein the programmable motherboard is arranged in a recessed cavity defined in the bristle securing base or the handle.

7. The motorized hairbrush of claim 1, wherein the battery is a rechargeable battery.

8. The motorized hairbrush of claim 7, wherein the rechargeable battery is chargeable via a USB port.

9. The motorized hairbrush of claim 8, wherein the USB port is disposed in a first recessed cavity.

10. The motorized hairbrush of claim 1, further comprising a brush count meter, wherein the brush count meter is configured to count a number of brush strokes.

11. The motorized hairbrush of claim 1, wherein at least one vibrating motor of the plurality of vibrating motors is a coin cell motor.

12. The motorized hairbrush of claim 1, wherein at least one vibrating motor of the plurality of vibrating motors is a cylindrical motor.

13. The motorized hairbrush of claim 1, wherein at least one vibrating motor of the plurality of vibrating motors is configured to operate at a plurality of speeds.

14. The motorized hairbrush of claim 13, wherein the plurality of speeds includes low, medium and high speed settings.

15. The motorized hairbrush of claim 1, wherein the battery is a lithium ion battery.

16. The motorized hairbrush of claim 1, wherein the bristle securing base is coupled to the handle by a hinge.

17. The motorized hairbrush of claim 16, wherein the hinge is configured to open and close the bristle securing base to expose a recessed cavity defined in the handle or the bristle securing base.

18. The motorized hairbrush of claim 17, wherein the battery is disposed in the recessed cavity.

19. The motorized hairbrush of claim 1, further comprising a gyroscope configured to count brush strokes.

20. The motorized hairbrush of claim 1, further comprising a humidity sensor or moisture meter.

* * * * *